US006391954B2

(12) United States Patent
Azizi et al.

(10) Patent No.: US 6,391,954 B2
(45) Date of Patent: May 21, 2002

(54) HIGH CLARITY IMAGE BEARING SHEET

(75) Inventors: Jamshid Azizi; Joseph C. Carls, both of Austin, TX (US); Shigeaki Dohgoshi, Sagamihara; Koji Kamiyama, Tama, both of (JP); Andrew C. Lottes, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/881,588

(22) Filed: Jun. 14, 2001

Related U.S. Application Data

(62) Division of application No. 09/407,743, filed on Sep. 28, 1999.

(51) Int. Cl.$^7$ .................................................. C08K 5/09

(52) U.S. Cl. ....................... 524/306; 524/308; 524/315; 524/317

(58) Field of Search ................................ 524/306, 308, 524/315, 317

(56) References Cited

U.S. PATENT DOCUMENTS

| | | | | |
|---|---|---|---|---|
| 2,855,324 | A | 10/1958 | Van Dorn | 117/25 |
| 4,071,362 | A | 1/1978 | Takenaka | 96/1.4 |
| 4,298,309 | A | 11/1981 | Stoltz | 414/745 |
| 5,208,093 | A | 5/1993 | Carls et al. | 428/195 |
| 5,302,439 | A | 4/1994 | Malhotra et al. | 428/195 |
| 5,451,458 | A | 9/1995 | Malhotra | 428/412 |
| 5,635,325 | A | 6/1997 | Inaba et al. | 420/106 |
| 5,795,695 | A | 8/1998 | Malhotra et al. | 430/120 |
| 5,897,940 | A | 4/1999 | Malhotra | 428/212 |

FOREIGN PATENT DOCUMENTS

| | | | |
|---|---|---|---|
| WO | WO 96/20079 | 7/1996 | B32B/3/00 |

*Primary Examiner*—Edward J. Cain
(74) *Attorney, Agent, or Firm*—Alan Ball; Gerald F. Chernivec; Gary L. Griswold

(57) ABSTRACT

The invention provides a recording sheet including an additive, referred to herein as a compatibilizer, to improve the quality of images formed by toner powder development of electrostatic charge patterns. Recording sheets, carrying images produced by toner powder transfer and fusion on a receptor surface, according to the present invention, exhibit improved light transmission and reduced light scattering. Specifically, a transparent sheet is provided having a toner-receptive coating containing about 4 wt. % to about 25 wt. % of a compatibilizer on at least one surface, wherein the coating has a low density yellow Q factor value at least 2 less than an identical coating without the compatibilizer.

10 Claims, No Drawings

HIGH CLARITY IMAGE BEARING SHEET

This is a divisional of Application No. 09/407,743 filed Sep. 28, 1999.

BACKGROUND OF THE INVENTION

1. Field of the Invention

The invention relates to high clarity image bearing sheets that, used with image projectors, provide bright projected images. More specifically, the invention provides transparent image bearing sheets, including coating additives selected to reduce scattering of light by toners and related materials used for the electrophotographic production of colored images. The coated, image-bearing sheets provide projected images having good color saturation, low light scattering, and high contrast due to the clarity and low haze of the sheets.

2. Description of Related Art

Since the introduction of electrophotographic copying and printing machines, using toner powder particles to develop electrostatic images, there has been a continuing emphasis on toner image transfer with faithful, quality fused image reproduction on the surface of a receptor sheet. Initially using black toner powder compositions, transferred to plain paper, electrophotographic imaging technology now extends to the application of colored images to clear films, to produce colored image transparencies suitable for projection using overhead projectors. With each development in technology, a need has arisen to re-visit issues of image quality with recent emphasis on transparency, color saturation, image contrast, edge sharpness, toner fusion and other characteristics that could reduce the acuity and visual impact of a projected image.

Study of the control of image characteristics revealed key requirements for producing optimum images developed by toner powders that were fused with a fuser roller after deposition on a receptor substrate. For example, the quality of the color image depends on the surface flatness including the areas covered by fused toner particles. A poorly fused toner image has multiple surfaces and edges which, upon projection, yield dimming gray tones leading to dull, poor color quality because of incident light scattering at the surfaces and edges. Improved flatness of the image bearing layer may be achieved if a receptor, coated on a film, has sufficient miscibility with a toner powder during image transfer and the toner powder exhibits low melt viscosity during elevated temperature image fusion.

Use of powder toners in electrophotographic copiers and printers is well known in the art. U.S. Pat. No. 2,855,324 discloses thermoplastic coated receptors to which a dry toner image may be transferred by contact under pressure. U.S. Pat. No. 4,071,362 discloses use of a styrene type resin to fuse with thermoplastic toner particles.

U.S. Pat. Nos. 5,208,093, 4,298,309 and 5,635,325 disclose a variety of solutions to achieve miscibility of the coated film with the toner while maintaining low melt viscosity.

U.S. Pat. No. 5,635,325 discloses a core/shell toner for developing electrostatic images including a binder resin, a colorant and an ester wax, wherein the core melts and acts as a release agent during fusing, eliminating the need for silicone based release agents to be applied to the fuser rolls.

U.S. Pat. No. 5,302,439 discloses a recording sheet which comprises a substrate and a coating thereon containing a binder and a material having a melting point of less than about 65° C. and a boiling point of more than about 150° C. and selected from the group consisting alkyl phenones, alkyl ketones, halogenated alkanes, alkyl amines, alkyl anilines, alkyl diamines, alkyl alcohols, alkyl diols, halogenated alkyl alcohols, alkane alkyl esters, saturated fatty acids, unsaturated fatty acids, alkyl aldehydes, alkyl anhydrides, alkanes, and mixtures thereof, and optional traction agent and antistatic agent. Materials from the various groups increase the adhesion of toner powder to the recording sheet.

U.S. Pat. No. 5,451,458 discloses a recording sheet which comprises a substrate and a coating thereon containing a binder selected from polyesters, polyvinyl acetals, vinyl alcohol-vinyl acetal copolymers, polycarbonates, and mixtures thereof, and an additive having a melting point of less than about 65° C. and a boiling point of more than about 150° C. and selected from the group consisting of furan derivatives, cyclic ketones, lactones, cyclic alcohols, cyclic anhydrides, acid esters, phosphine oxides and mixtures thereof, and optional filler, and optional antistatic agent and an optional biocide. The various classes of additives improve image transfer such that almost 100% of the toner powder releases from the imaging drum to the recording sheet.

Previous studies related to the quality of images produced by transfer of toner powder, from imaging drums of electrophotographic copiers and printers to suitable recording sheets, focused attention on the bond formed between the powder and the recording sheet. Having demonstrated sufficient adhesion, measurement of optical density indicated the intensity of the image formed on the recording sheet, as shown by U.S. Pat. No. 5,451,458. Adhesion of toner powder particles and measurement of image density describe image characteristics in relatively crude terms, showing successful toner powder transfer. Although successfully transferred to a transparency sheet, a toner powder image may include defects which, upon projection, become enlarged to cause noticeable image distortion. A need exists for improvement of projected image quality, with emphasis on transparency for optimum light transmission with minimum scattering, high color saturation, image contrast and edge sharpness associated with accurate image transfer and improved toner fusion.

SUMMARY OF THE INVENTION

The invention provides a recording sheet including an additive, referred to herein as a compatibilizer, to improve the quality of images formed by toner powder development of electrostatic charge patterns. Recording sheets, carrying images produced by toner powder transfer and fusion on a receptor surface, according to the present invention, exhibit improved light transmission and reduced light scattering. Further benefits in image quality are attainable by optional inclusion of a lubricating additive in the receptor surface to minimize hot offset, as defined below. These improvements translate into sharp, colorful imaged transparencies that provide an attractive complement for meeting and seminar presentations.

The invention is particularly effective in systems using core/shell toners where the core and the shell form an immiscible heterogeneous blend after fusing, with high levels of light scatter.

A suitable receptive surface layer includes at least one compatibilizer, and optionally a lubricant additive, coated on a suitable transparent substrate. The coating composition may be applied either from solution or as an aqueous dispersion. Coating compositions, according to the present invention, include a soluble or dispersible binder, and at least one compatibilizer. After coating and removal of the coating vehicle, i.e. either solvent or water, the resulting layer is highly transmissive, presenting a toner powder receptor surface that minimizes formation of light scattering regions in the transferred and fused image. Reduction in light scattering contributes to retention of the high light transmission characteristics of recording sheets of the present invention when used in electrophotographic copiers, printers, and related devices. Measurement of image characteristics, including haze levels and Q Factors, identified preferred property ranges and led to a Quantitative Structure Activity Relationship (QSAR) that identifies materials satisfying the requirements for compatibilizers of the current invention. A further benefit of the invention is the potential to lower the fuser roll temperature to reduce heat distortion while still improving the appearance of the imaged recording sheet.

In more specific terms, the current invention provides a transparent sheet including a coated layer receptive to toner powder images. The coated layer comprises a clear binder and from about 4% to about 25% of a compatibilizer, based upon the weight of the coated layer. Amounts of compatibilizer, in this range, reduce light scattering to low levels, yielding improvements in Q factors of at least about 2, measured using a low density yellow toner image, and tested according to the method provided, infra. Optionally, the coated layer further contains a lubricant additive to further reduce the Q Factor, and to reduce hot offset.

Coating of the receptor layer to a transparent sheet requires the preparation of a coating composition either as a solution or an aqueous dispersion. Selection of concentrations of components, provides coating formulations in solution or dispersion, which yield dry coated layers containing from about 25 wt. % to about 96 wt % of binder and from about 4% to about 25% of compatibilizer, and optionally up to about 15 wt % of a lubricant additive. When dry, the coated layers possess high clarity and reduce scattering of light, especially in imaged regions, of recording sheets. The coating can also include up to about 65% fillers.

As used herein, these terms have the following meanings.

1. The term "compatibilizer" means a material included in a coated layer to reduce light scattering from images formed by fusing color toner powder patterns at the surface of the coated layer.

2. The term "core/shell toner" refers to a toner powder comprising a core material, typically a wax, to act as a release agent, and a shell coating that includes a binder and the colorant for the toner particle.

3. The term "Q factor" refers to a property of a light transmitting coating, measured as a white light approximation using a haze meter. This factor provides a relationship between incident and transmitted light according to the following equation:

$$Q = \frac{\log(100/(R_{closed} - R_{open}))}{\log(100/R_{closed})}$$

$R_{closed}$=% light scattered $R_{open}$=% light transmitted

4. The term "Qp" refers to a Factor, predictable for a selected molecular structure, by calculation using the following equation, based upon computational methods of statistical regression analysis.

$$Q_p = -2.34 + 0.0252*TPSA + 23.7*RNCG + 0.853Y$$

TPSA represents total polar surface area, RNCG is relative negative charge, and, Y is (AlogP-3.76) for AlogP equal to or greater then 3.76, and Y equals 0 for AlogP less than 3.76. AlogP represents an octanol/water partition coefficient.

5. The term "hot offset" refers to the sticking and pick-off of melted toner to the fuser roll. In some cases, the offset toner is re-deposited onto the recording sheet one fuser roll circumference in distance from the original image. This causes an objectionable "ghost" image on the imaging sheet.

6. The term "bead defect" means a light absorbing or light scattering non-image spot which becomes visible upon enlargement during projection.

All parts, percents, and ratios herein are by weight unless otherwise specifically stated. Amounts expressed as a weight percent of the coating are weight percents of the dry coating.

DETAILED DESCRIPTION OF THE INVENTION

Image recording sheets, according to the present invention, comprise a transparent substrate supporting a transparent coated layer suitable for receiving and retaining fused patterns of colored toner particles produced by electrographic imaging techniques. The transparency of the substrate and the transparency of the coated layer are essential for maximum light transmission through the imaged sheet. Also the various hues of the fused areas of colored toner powder should act, insofar as possible, as color filters which allow maximum intensity of the transmitted portion of the spectral input.

An element placed in the path of a light beam will modify the characteristics of the light beam. Opaque elements block the light, hazy elements cause loss of light intensity as it passes through the element. Conversely, elements of high transparency allow the light beam to maintain its brightness quality after passing through the element. If the element is colored, the emergent light has a different color to the incident light. Combinations of colorless and colored areas provide pictures that may be projected on a suitable screen. If the colorless portion or background of the picture is either opaque or hazy, the projected picture appears lifeless and dull having little capacity to hold an observer's attention.

For colorful, attractive color rendition, a projected image preferably retains a high proportion of the light present in the incident beam. This is especially important in meeting and seminar presentation situations in which the content, composition and bright coloring of projected images help to attract audience attention and reinforce the spoken message. When a projected image appears gray, through high haze levels, or includes random spotting because of poor toner particle transfer, the audience becomes diverted from the main topic by turning their attention to the scrutiny of image dullness and background defects.

The problems associated with poor light transmission through transparent image recording sheets, may be overcome by designing these articles for optimum optical and image quality. Low haze level is a desirable property and methods exist for its measurement. Another measurement, Q Factor, derived from haze measurement allows comparison of emergent light intensity after passage through a variety of light transmitting sheets. Low Q values are desirable with values approaching about 1.0 being about the optimum attainable. A material exhibiting a Q factor of about 1.0 allows light to pass essentially free from scattering. Increased light scattering raises the value of Q. Therefore, for optimum projected image intensity, recording sheets, and the colored image areas they bear, should exhibit Q factors as low as achievable.

Q Factor measurement was used extensively in selecting materials for recording sheets according to the present invention. After screening of many materials, sufficient experimental data existed to allow application of modern computational statistical regression analysis to provide an optimized set of descriptors corresponding to useful compatibilizers. Data analysis addressed the development of a Quantitative Structure Activity Relationship (QSAR) using Cerius2 (Version 3.8) QSAR+, a software program available from Molecular Simulations Inc. QSAR+ provides several sets of descriptors that may be included in the analysis. The product of regression analysis is a relationship that predicts Q Factors closely resembling measured values obtained earlier by experimental methods. Predicted Q Factors are designated as Qp herein. The accuracy of the predictive capability of QSAR accelerated the rate of selection or rejection of candidate compatibilizers, thereby shortening the development time for effective recording sheets. Also, QSAR calculations confirms that preferred transparentizer materials, polyethylene glycol and polypropylene glycol, disclosed by WO 96/20079, gave unacceptably high Q values.

Using QSAR refinement for Qp Factor values, based upon data from the present invention, measured using equipment described herein, effective compatibilizers yield Qp Factors in a range from about 1.0 to about 5.0. Preferred compatibilizers generate Qp Factors of no more than about 4.8 and most preferred compatibilizers give Qp Factors of no more than 4.3.

Useful substrate materials and coating formulations include binders, compatibilizers and optionally lubricant additives which meet the requirements for coated layers to receive and retain high quality toner powder images.

Film substrates may be formed from any polymer capable of forming a self-supporting sheet, e.g., films of cellulose esters such as cellulose triacetate or diacetate; polystyrene; polyamides; vinyl chloride polymers and copolymers; polyolefin and polyallomer polymers and copolymers; polysulphones; polycarbonates; polyesters; and blends thereof. Suitable films may be produced from polyesters obtained by condensing one or more dicarboxylic acids or their lower alkyl diesters in which the alkyl group contains up to 6 carbon atoms, e.g., terephthalic acid, isophthalic, phthalic, 2,5-,2,6-, and 2,7-naphthalene dicarboxylic acid, succinic acid, sebacic acid, adipic acid, azelaic acid, with one or more glycols such as ethylene glycol; 1,3-propanediol; 1,4-butanediol; and the like.

Preferred film substrates or backings are cellulose triacetate or cellulose diacetate; poly(ethylene naphthalate); polyesters; especially poly(ethylene terephthalate), and polystyrene films. Poly(ethylene terephthalate) is highly preferred. Preferred film substrates have a caliper ranging from about 50 $\mu$m to about 200 $\mu$m. Film backings having a caliper of less than about 50 $\mu$m are difficult to handle using conventional methods for graphic materials. Film backings having calipers over about 200 $\mu$m are stiffer, and present feeding difficulties in certain commercially available electrographic printers.

When polyester film substrates are used, they can be biaxially oriented to impart molecular orientation, and may also be heat set for dimensional stability during fusion of the image to the support. These films may be produced by any conventional extrusion method.

Binders, used either in solution or dispersion, include polymeric binders which, after coating and drying, have the capability to produce coated layers of high clarity and excellent scatter-free light transmission.

Useful binders include thermoplastic resins such as polyester resins, styrene resins, acrylic resins, epoxy resins, styrene-butadiene copolymers, polyurethane resins, vinyl chloride resins, styrene-acrylic copolymers, and vinyl chloride-vinyl acetate resins.

One preferred binder class is polyester resins, including UE3250, a polyester resin available from Unitika, and sulfopolyester resins, e.g., Eastek 1200, a sulfopolyester resin available from Eastman Chemical, and “WB-50”, a sulfopolyester resin made by 3M Company. Other useful polyesters include those based on bisphenol A, such as ATLAC™382E, (also sold as ATLAC™R 32-629), available from Reichold Chemical as well as bisphenol A monomers and their derivatives, (e.g., the dipropylene glycol ether of bisphenol A). A suitable carrier binder such as Vitel PE 222 polyester resin, available from The Goodyear Tire and Rubber Company, is also present when bisphenol A monomers or their derivatives are used to facilitate coating.

Another preferred binder class is polyurethanes. Useful commercially available polyurethanes are usually provided as a dispersion which may include one or more polyurethane structure. Some useful commercial resins include, from Zeneka Resins, NeoRez R-966, an aliphatic-polyether polyurethane; NeoRez® XR-9699, aliphatic-polyester acrylate polymer/polyurethane (65/35 wt %) hybrid; from Dainichiseika Co. Ltd., Resamine® D-6075 an aliphatic-polycarbonate polyurethane, Resamine® D-6080 aliphatic-polycarbonate polyurethane, and Resamine® D-6203 aliphatic-polycarbonate polyurethane; from Dainippon Ink and Chemicals, Inc., Hydran AP-40F an aliphatic-polyester; Hydran® AP-40N, an aliphatic-polyester polyurethane, and Hydran® HW-170, an aliphatic-polyester. Especially preferred polyurethane dispersions are available from B.F. Goodrich Co. under the trade name Sancure®, e.g., Sancuret® 777, Sancure® 843, Sancure® 898, and Sancure® 899, all of which are aliphatic polyester polvurethane dispersions.

Formulations and coatings of the invention comprise at least one compatibilizer. Useful compatibilizers include polyalkylene glycol esters such as polyethylene glycol dibenzoate; polypropylene glycol dibenzoate; dipropylene glycol dibenzoate; diethylene/dipropylene glycol dibenzoate; polyethylene glycol dioleate; polyethylene glycol monolaurate; polyethylene glycol monooleate; triethylene glycol bis(2-ethylhexanoate; and triethylene glycol caprate-caprylate. Alkyl esters, substituted alkyl esters and aralkyl esters also act as compatibilizers including triethyl citrate; tri-n-butyl citrate, acetyltriethyl citrate; dibutyl phthalate; diethyl phthalate; dimethyl phthalate; dibutyl sebacate; dioctyl adipate; dioctyl phthalate; dioctyl terephthalate; tributoxyethyl phosphate; butylphthalylbutyl glycolate; dibutoxyethyl phthalate; 2-ethylhexyldiphenyl phthalate; and dibutoxyethoxyethvl adipate. Additional suitable compatibilizers include alkyl amides such as N,N-dimethyl oleamide and others including dibutoxyethoxyethyl formal; polyoxyethylene aryl ether; (2-butoxyethoxy) ethyl ester of mixed dibasic acids; and dialkyl diether glutarate. Compatibilizers are present in the final dry coating at levels of from about 4% to about 25% by weight of the total formulation, preferably from about 6% to about 20%.

Preferred compatibilizers are those having sufficiently low vapor pressures such that little or no evaporation occurs when heated during the fusing process. Such compatibilizers have boiling points of at least about 300° C., and preferred compatibilizers have boiling points of at least about 375° C.

One group of preferred compatibilizers comprises difunctional or trifunctional esters. As used herein, these esters, also called “di-esters” and “tri-esters”, refer to multiple esterification of a di-acid or tri-acid with an alcohol or the multiple esterification of a mono-acid with a diol or triol or a combination thereof. The governing factor is the presence of multiple ester linkages.

Useful compatibilizers in this group include such compatibilizers as dibutoxvethoxyethyl formal, dibutoxyethoxyethyl adipate, dibutyl phthalate, dibutoxyethyl phthalate, 2-ethylhexyl diphenyl phthalate, diethyl phthalate, dialkyl diether glutarate, 2-(2-butoxyethoxy)ethyl ester of mixed dibasic acids, triethyl citrate; tri-n-butyl citrate, acetyltriethyl citrate, dipropylene glycol dibenzoate, propylene glycol dibenzoate, diethylene/dipropylene dibenzoate, and the like.

The dispersion and coating may also contain fillers. Useful materials include colloidal silica, colloidal alumina, polymeric colloids, porous silica, laponite, bentonite, and the like. When used, such materials comprise up to about 65% of the final coating.

The image receptive coating may also comprise additives in addition to the binders that can improve color quality, tack, and the like, in such amounts as do not effect the overall properties of the coated material. Useful additives include such as catalysts, thickeners, adhesion promoters, surfactants, glycols, defoamers, crosslinking agents, thickeners, and the like, so long as the addition does not negatively impact the performance.

The receptive layer may also include particles such as polymeric particles, starch particles, and inorganic particles such as silicas. Useful polymeric particles include, but are not limited to, acrylic particles, e.g., polybutylmethacrylate, polymethylmethacrvlates, hydroxyethylmethacrylate, and mixtures or copolymers thereof, polystyrene, polyethylene, and the like.

Antistatic materials are also useful as additives. Useful agents are selected from nonionic antistatic agents, anionic antistatic agents, and fluorinated antistatic agents. Certain cationic antistatic agents may also be useful; however, care must be taken not to use antistatic compounds incompatible with the binder resin, or they will precipitate out. A preferred antistatic agent includes a fluorinated agent, and a salt, e.g., lithium nitrate, sodium nitrate, sodium chloride, and the like.

The coating can be applied to the film backing by any conventional coating technique, e.g., deposition from a solution or dispersion of the resins in a solvent or aqueous medium, or blend thereof, by means of such processes as Meyer bar coating, curtain coating, slide hopper coating, knife coating, reverse roll coating, rotogravure coating, extrusion coating, and the like, or combinations thereof.

Drying of the coating can be effected by conventional drying techniques, e.g., by heating in a hot air oven at a temperature appropriate for the specific film backing chosen. For example, a drying temperature of about 120° C. is suitable for a polyester film backing.

Preferred (dry) coating weights are from 0.5 $g/m^2$ to about 15 $g/m^2$, with 1 $g/m^2$ to about 10 $g/m^2$ being highly preferred.

To promote adhesion of the toner-receptive layer to the film backing, it may be desirable to treat the surface of the film backing with one or more primers, in single or multiple layers. Useful primers include those primers known to have a swelling effect on the film backing polymer. Examples include halogenated phenols dissolved in organic solvents. Alternatively, the surface of the film backing may be modified by treatment such as corona treatment or plasma treatment.

Recording sheets of the invention are particularly suitable for the production of imaged transparencies for viewing in a transmission mode or a reflective mode, i.e., in association with an overhead projector.

The following examples are for illustrative purposes, and do not limit the scope of the invention, which is defined by the claims.

TEST METHODS

Q Factor

In general, Q Factor is a very good way to determine how well a particular color transparency film projects bright, saturated colors. This factor compares absorption and scattering of light as it passes through a transparent region that may be colored or colorless. A variety of methods may be used to determine Q Factor, with each experimental method influencing numerical values such that a Q Factor, for a selected material, produced by one method may prove different in magnitude to a Q Factor, for the same material, obtained by another method. Such differences may be attributable to differences in geometry and dimensions of measuring equipment.

It is possible to provide an appreciation for the impact of light scattering on Q Factors by review of situations where there is only absorption of light and those wherein light is both absorbed and scattered during passage through a substrate. The former case, without scattering, may be exemplified by a colored, optical filter similar to that used to cover lenses of photographic cameras or theater spotlights. The filter may exhibit strong absorption of a portion of the wavelengths present in the incident beam, to produce a colored emergent beam. However, optical quality reduces scattering to a very low level, yielding a dimensionless Q Factor approaching unity. As scattering within a substrate increases, there is a corresponding increase in Q Factor, suggesting that values in excess of 1.0 indicate increasing levels of scattering. Increasing Q Factors appear to correlate well with subjective evaluations of gradual decay in projected image quality, observed as onset of grayer, duller images lacking in color and contrast.

Q Factor determination is especially useful for color laser transparencies because the particulate nature of the toner predisposes the transparency film toward high levels of light scatter. The scattered light causes a muddiness or greyness superimposed on the colors. Q Factor very accurately measures the relative levels of scattered light (which makes the image gray) to absorbed light (which gives the images color.)

The Q Factor has a minimum (limit) value of 1. This corresponds to situations in which there is virtually no light scattered. A good example would be a high quality optical filter of a particular color. As the level of scattering increases, so does the Q Factor.

As regards color perception, it is useful to think about differences (reductions) in Q Factor corresponding to improvement in image brightness and saturation. In color laser transparency films, one can note three levels of Q Factor reduction, corresponding to different levels of perceived improvement in image quality: (1) the difference in Q Factor that is minimally perceptible, (2) the difference at which a significant improvement in image brightness/saturation is noted, and (3) the difference at which a very noticeable and compelling improvement is noted.

The values that these Q Factor differences take are generally a function of the color and the density of the image. One can roughly divide images into low density and high density. The dividing point between low and high density is defined to be around the 50 % level of printed density. In other words, if a printer is capable of printing 256 intensity levels of a particular color, low densities will be those in the range 1–128 and high densities those in the range 129–256. This division allows definition of different levels described in the preceding paragraph, yielding a quantitative approximation as follows. Note that the values correspond to yellow toner images; because Q is measured using white light, the values of Q Factor difference corresponding to perception vary with the color chosen.

| | Q Factor Difference for Yellow Toner Images | |
|---|---|---|
| | Low Density (</= 50%) | High Density (>50%) |
| (1) Minimum Perceptible | 0.5 | 0.25 |
| (2) Noticeable Improvement | 1.0 | 0.5 |
| (3) Very Noticeable Improvement | 2.0 | 1.0 |

Q FACTOR MEASUREMENT

Summary of Method

This test method describes a procedure for evaluating the color quality of an imaged color transparency. This measurement is known as "Q" Factor. The true "Q" Factor is dependent on wavelength; this test method describes the procedure for integrated "Q" using yellow print samples.

Equipment

BYK-Gardner XL-211 Hazegard Hazemeter

Geometric Test Standard: Gardner Haze 10

Equipment Preparation

Allow the instrument to warm up for 10–15 minutes.

Check the instrument calibration using a Gardner Haze 10 Geometric Test Standard (GTS). Set the 100% level with the GTS in place.

Sample Preparation

Image an experimental transparent sheet using a color laser printer or color copier set to produce a yellow colored image area. Avoid image contamination by fingerprints, dust, or scratches.

Q Factor Measurement

The yellow image area must be large enough to cover the entrance port of the sensing unit so that incident light passes through the yellow colored area of the sample.

After calibration of the Hazemeter insert a colorless area of the transparency into the entrance port of the sensing unit. Set the REFERENCE/OPEN switch to OPEN and record the value as "Post-copy haze."

Insert a yellow colored area of the transparency into the entrance port of the sensing unit. With the REFERENCE/OPEN switch at OPEN record the "Open" reading.

Set the REFERENCE/OPEN switch back to REFERENCE. Record the "Reference" reading of the colored area.

Factor Calculation $$Q = \frac{\text{Light attenuation by absorption} + \text{Light attenuation by scattering}}{\text{Light attenuation by absorption}}$$

Alternatively, the Q Factor, in this case for a yellow toner image, may be calculated from measurements made with a BYK-Gardner XL-211 Hazegard Hazemeter using the following equation:

$$Q = \frac{2 - \log(\text{Reference reading} - \text{Open reading})}{2 - \log(\text{Reference reading})}$$

Quantitative Structure Activity Relationship (QSAR)

Summary

The term "Qp" refers to a Q Factor, predictable for a selected molecular structure, according to statistical regression analysis of terms suggested by Cerius2 (Version 3.8) QSAR+software available from Molecular Simulations Inc. Calculation refinements provided the following equation for Qp.

$$Qp = -2.34 + 0.0252 * TPSA + 23.7 * RNCG + 0.853Y$$

TPSA represents total polar surface area, RNCG is relative negative charge, and, Y is (AlogP-3.76) for AlogP equal to or greater then 3.76, and Y equals 0 for AlogP less than 3.76. AlogP represents an octanol/water partition coefficient.

QSAR+provides five sets of descriptors for terms used for multiple regression analysis. The first is a set of electronic descriptors, including Apol (sum of atomic polarizibilities) and Dipole (dipole moments). The second is a set of spatial descriptors, including RadOfGyration (radius of Gyration), Jurs descriptors (Jurs Charged Partial Surface Areas (CPSA) Descriptors), Area, Density, PMI (Principal Moment of Inertia), Vm (Molecular Volume). The third is a set of structural descriptors, including MW, Rotlbonds, Hbond acceptor, and Hbond donor. The fourth set is related to thermodynamic properties, including AlogP, and MolRef. The fifth is a set of topological descriptors based on molecular structure.

Development of suitable models uses a Genetic Function Algorithm (GFA). The GFA generates an initial population of models and ranks them according to a Lack of Fit (LOF) measure of quality. Models from the initial population are selected with probability increasing with fit performance. A portion is taken from each model and the two selections are recombined. The resulting model is analyzed for LOF, and is ranked with the initial population. This procedure is repeated, with the best models retained in the population, until the population converges. The output of the GFA consists of a list of models, or equations that describe the target behavior. The best model is selected on the bases of statistical validity, reasonable interpretation and predictive utility (see above, the equation for calculating Qp from molecular structure activity relationships).

Hot Offset

Hot offset appears as a repeating ghost image with a repeat pattern on the final transparency corresponding to the circumference of the fuser roll. The pattern results from splitting of the toner layer during fusing of the toner to a receptor. During this process, a fraction of the developed toner image fails to release from the fuser roll. Some of the residual toner transfers during subsequent contacts with receptor surfaces. This unintentional transfer produces ghost images with each revolution of the fuser roll over the film receptor. Addition of certain fillers to the receptor layer produces a cleaner developed film with less evidence of ghost images. Preferred fillers include silica, alumina and tin oxide, polymeric fillers including latexes, and combinations of these materials.

EXAMPLES

Example 1

Effect of Different Compatibilizers

Solutions for hand coatings were prepared by mixing according to the following formula:

TABLE 1

Coating Composition for Example 1

| Component | Raw Material Total (% Active Material) | Raw Material Solids | Dry Coating Wt. % |
|---|---|---|---|
| Sancure ® 777 | 14.29 g (35%) | 5.00 g | 82.64% |
| Compatibilizer "i" | 1.00 g (100%) | 1.00 g | 16.53% |
| Zonyl ® FS 300 | 0.50 g (10%) | 0.05 g | 0.83% |
| Deionized Water | 14.21 g (10%) | 0.00 g | 0.0 |

SANCURE® 777 is available from as a 35% solids, polyurethane dispersion, in water.

ZONYL® FS 300 fluorosurfactant is available from E.I. du Pont de Nemours and Co.

The compatibilizers are available from companies as listed in Table 2 below.

Compatibilizer "i" is taken from Table 2, where the manufacturer, chemical description and factors Q and Qp may also be noted. One coating solution was made separately for each compatibilizer listed in Table 2, as well as one reference sample containing no compatibilizer.

Hand coatings were made from each solution. Coating formulations were coated onto 5 mil poly(ethylene terephthalate) film using a #15 Mayer rod. The coatings were dried at around 104° C. (220° F.) for 60 seconds. The resulting dry weight of the coated layers was in the range of 5 g/m$^2$.

TABLE 2

Compatibilizers Used In Example 1

| TRADE NAME | MANUFACTURER | CHEMICAL NAME OR IDENTIFICATION | Q | QP |
|---|---|---|---|---|
| SR660 | Sartomer | dibutoxyethoxyethyl formal | 2.51 | 2.16 |
| Eastman TEG-EH | Eastman Chemical | triethylene glycol bis(2-ethylhexanoate) | 2.96 | 3.42 |
| SR650 | Sartomer | dibutoxyethoxyethyl adipate | 2.99 | 3.65 |
| Plasthall 4141 | C.P. Hall Co. | triethylene glycol caprate-caprylate | 3.12 | 4.10 |
| Plasthall 83SS | C.P. Hall Co. | 2-(2-butoxyehtoxy)ethyl ester of mixed dibasic acids | 3.12 | 3.61 |
| Eastman DBP | Eastman Chemical | dibutyl phthalate | 3.20 | 3.29 |
| Plasthall 200 | C.P. Hall Co. | dibutoxyethyl phthalate | 3.25 | 2.84 |
| Santicizer 141 | Solutia | 2-ethylhexyl diphenyl phthalate | 3.40 | 4.59 |
| Eastman DEP | Eastman Chemical | diethyl phthalate | 3.55 | 3.86 |
| Plasthall 7050 | C.P. Hall Co. | dialkyl diether glutarate | 3.57 | 3.69 |
| Benzoflex 9-88 | Velsicol | dipropylene glycol dibenzoate | 3.59 | 2.94 |
| Citroflex A-2 | Reilly Industries | acetyltriethyl citrate | 3.67 | 3.53 |
| Morflex 190 | Reilly Industries | butyl phthalyl butyl glycolate | 3.67 | 3.59 |
| Citroflex 4 | Reilly Industries | tri-n-butyl citrate | 3.71 | 4.52 |
| Benzoflex 400 | Velsicol | polypropylene glycol dibenzoate | 3.74 | 2.92 |
| KP-140 | | tributoxyethyl phosphate | 3.79 | 4.17 |
| Benzoflex 50 | Velsicol | diethylene/dipropylene glycol dibenzoate | 3.81 | 3.57 |
| Santicizer 160 | Solutia | butyl benzyl phthalate | 3.90 | 3.42 |
| Benzoflex P-200 | Velsicol | polyethylene glycol dibenzoate | 3.99 | 3.46 |
| CPH-30-N | C.P. Hall Co. | polyethylene glycol 400 monolaurate | 4.06 | 4.84 |
| Hallcomid M-18-OL | C.P. Hall Co. | N,N-dimethyl oleamide | 4.10 | 4.10 |
| CPH-41-N | C.P. Hall Co. | polyethylene glycol 600 monooleate | 4.19 | 4.96 |
| Eastman DOA | Eastman Chemical | dioctyl adipate | 4.23 | 4.63 |
| Pycal 94 | ICI Americas | polyoxyethylene aryl ether | 4.48 | 4.21 |
| Citroflex 2 | Reilly Industries | triethyl citrate | 4.52 | 5.09 |
| Eastman DOP | Eastman Chemical | dioctyl phthalate | 4.54 | 4.65 |
| Eastman DMP | Eastman Chemical | dimethyl phthalate | 4.98 | 4.91 |
| Morflex 560 | Reilly Industries | tri-n-hexyl mellitate | 5.15 | 5.87 |
| Eastman triacetin | Eastman Chemical | 1,2,3-propanetriol triacetate | 5.34 | 5.12 |
| CPH-27-N | C.P. Hall Co. | polyethylene glycol 200 monolaurate | 5.64 | 4.97 |
| Plasthall BSA | C.P. Hall Co. | N,n-butylbenzenesulfonamide | 6.26 | 6.36 |
| CPH-39-N | C.P. Hall Co. | polyethylene glycol 200 monooleate | 6.47 | 5.60 |
| Eastman TXIB | Eastman Chemical | 2,2,4-trimethyl-1,3-pentanediol diisobutyrate | 6.55 | 5.54 |
| PEG400 | Aldrich Chemical | polyethylene glycol 400 | 6.60 | 6.17 |
| PEG600 | Aldrich Chemical | polyethytene glycol 600 | 6.65 | 6.13 |
| Eastman DOTP | Eastman Chemical | dioctyl terephthalate | 6.72 | 5.55 |
| no compatibilizer | | | 8.0 | |
| CG3700 | 3M | | 10.6 | |

TABLE 1-continued

The sample coatings were imaged in a Hewlett-Packard Color Laserjet 4500 color laser printer using a test pattern consisting of high, medium and low density yellow blocks. The Q factor of the low density block from each image was measured. Table 2 shows the measured Q factor for each candidate compatibilizer solution. These measured Q Factors were compared against the reference containing no compatibilizer as well as a commercially available transparency film for color laser printers (3M brand CG3700). This commercial brand comprises an acrylic copolymer receptor coating on a PET substrate. No compatibilizer is present in this receptor coating.

Some of the compatibilizers yielded Q Factors that were similar to the two reference samples indicating little or no improvement in performance, some yielded Q Factors that were lower than the two reference samples, indicating improved image transparency. The lower the Q Factor compared to the references, the greater the improvement in projected image transparency. In many cases the improvement in projected image quality was quite dramatic, corresponding to a substantial reduction in the Q Factor. As discussed earlier, for these low density images, a reduction in the Q Factor compared to the references of 1.0 corresponds to a significant improvement in the perceived brightness and saturation. A reduction of 2.0 compared to the references corresponds to a very significant improvement.

Example 2

Effect of Compatibilizer Level

Solutions for hand coating with differing levels of compatibilizer were prepared by mixing according to the following general formula:

TABLE 3

Coating Composition for Example 2

| Component | Raw Material Total (% Active Material) | Raw Material Solids |
|---|---|---|
| Sancure 777 | 14.29 g (35%) | 5.00 g |
| Sartomer SR650 | x g (100%) | x g |
| Zonyl FS 300 | 0.50 g (10%) | 0.05 g |
| Xama-2 | 1.50 g (10%) | 0.15 g |
| 11 micron PMMA beads | 0.50 g (10%) | 0.05 g |
| Deionized Water | y g (100%) | 0.00 g |

POLYMETHYLMETHACRYLATE 11.0 micron beads are manufactured by Minnesota Mining and Manufacturing Co., St. Paul, Minn.

SARTOMER SR 650 is bis[2-(2-butoxyethoxy)ethyl] adipate Xama®-2 is an aziridine crosslinking agent, available from B. F. Goodrich.

In Table 3. "x" refers to the mass of compatibilizer that was added to the coating solution, and "y" refers to the mass of deionized water added to maintain the total solids of the solution at a fixed level of 25.5%. These values are given in Table 4:

TABLE 4

Compatibilizer and Deionized Water Additions for Example 2

| Example | Percent Compatibilizer Based on Resin: | Compatibilizer Added: | Deionized Water Added: |
|---|---|---|---|
| 2-1 | 0% | 0.00 g | 5.10 g |
| 2-2 | 1% | 0.05 g | 5.27 g |
| 2-3 | 2% | 0.10 g | 5.40 g |
| 2-4 | 4% | 0.20 g | 5.70 g |
| 2-5 | 8% | 0.40 g | 6.30 g |
| 2-6 | 16% | 0.80 g | 7.50 g |
| 2-7 | 32% | 1.60 g | 9.90 g |

Hand coatings were made from each. Coating formulations were coated onto 5 mil poly(ethylene terephthalate) film using a #12 Mayer rod. The coatings were dried at around 104° C. (220° F.) for 60 seconds. The resulting dry weight of the coated layers was in the range of 5 g/$m^2$.

The sample coatings corresponding to Examples 2-1 through 2-7 were imaged in a Hewlett-Packard Color Laserjet 4500 color laser printer using a three part test. pattern using blocks of yellow fused toner having high, medium and low image density. The Q Factor of the low density block and the high density block from each test pattern was measured. Table 5 shows the measured Q factor for each compatibilizer level as well as the Q Factor from 3M CG3700 imaged at the same time.

TABLE 5

Low and High Density Q Factors with Increasing Compatibilizer

| Example | Percent Compatibilizer Based on Resin: | Low Density Q Factor: | High Density Q Factor: |
|---|---|---|---|
| 2-1 | 0% | 14.7 | 9.2 |
| 2-2 | 1% | 13.8 | 8.9 |
| 2-3 | 2% | 12.8 | 9.1 |
| 2-4 | 4% | 13.6 | 8.8 |
| 2-5 | 8% | 11.2 | 7.7 |
| 2-6 | 16% | 7.2 | 6.3 |
| 2-7 | 32% | 5.6 | 5.2 |
| 3M CG3700 | — | 15.5 | 9.5 |

The data indicate a significant reduction in Q Factor compared to the reference (3M CG3700) occurs for both low and high density yellow images at compatibilizer levels greater than 4%.

Example 3

Effect of Coating Weight

A solution for hand coating at different coating weights were prepared by mixing the following general formula and then making various dilutions corresponding to Examples 3-1 through 3-6.

TABLE 6

Coating Composition for Example 3

| Component | Raw Material Total (% Active Material) | Raw Material Solids | Dry Coating Wt. % |
|---|---|---|---|
| Sancure ® 777 | 14.29 g (35%) | 5.00 g | 80% |
| Sartomer ® SR650 | 1.00 g (100%) | 1.00 g | 16.0% |
| Zonyl ® FS 300 | 0.50 g (10.0%) | 0.05 g | 0.8% |
| XAMA-2 | 1.50 g (10.0%) | 0.15 g | 2.4% |
| 11 micron PMMA beads | 0.50 g (10.0%) | 0.05 g | 0.8% |
| Deionized Water | 7.50 g (100%) | 0.00 g | |

Solution 3-1 was then diluted with deionized water to various lower solids levels and coated using a #12 Mayer rod. The coatings were dried at around 104° C. (220° F.) for 60 seconds. To reach an additional higher level of coating weight, the coating composition of Example 3 was also coated using a #24 Mayer rod. Table 7 designates Example 3 as Solution 3-1 then further shows the dilution levels for Solutions 3-2 to 3-7 using deionized water. Dilution affects formulation solids and dry coat weight while Mayer Rod selection affects the dry coating weight through changes in wet coating weight, for undiluted compositions. Dry coating weight is in g/$m^2$.

TABLE 7

Coating Weight Variation for Compositions Based on Table 6

| Solution | Dilution Ratio: | Percent Solids: | Mayer Rod #: | Dry Coat Weight: |
|---|---|---|---|---|
| 3-1 | no dilution | 25.00 | 24 | 10.8 |
| 3-2 | no dilution | 25.00 | 12 | 5.4 |
| 3-3 | 1:1 | 12.50 | 12 | 2.7 |
| 3-4 | 1:3 | 6.25 | 12 | 1.3 |
| 3-5 | 1:7 | 3.13 | 12 | 0.7 |
| 3-6 | 1:15 | 1.56 | 12 | 0.3 |

The sample coatings were imaged in a Hewlett-Packard Color Laserjet 4500 color laser printer using a three part test pattern using blocks of yellow fused toner having high, medium and low image density. The Q Factor of the low density block and the high density block from each test pattern was measured. Table 8 shows the measured Q factor for each coating weight level as well as the Q Factor from 3M CG3700 imaged at the same time.

TABLE 8

Change in Low and High Density Q Factors with Coating Weight

| Example | Dry Coat Weight: | Low Density Q Factor: | High Density Q Factor: |
|---|---|---|---|
| 3-1 | 10.8 | 8.9 | 5.9 |
| 3-2 | 5.4 | 6.3 | 6.3 |
| 3-3 | 2.7 | 9.3 | 7.3 |
| 3-4 | 1.3 | 12.2 | 8.5 |
| 3-5 | 0.7 | 13.3 | 8.6 |
| 3-6 | 0.3 | 17.7 | 9.4 |
| 3M CG3700 | — | 17.4 | 10.7 |

The data show that improved imaging performance compared to the reference occurs at coating weight levels greater than about 0.5 g/m$^2$.

Example 4

Effect of Wax

Two stock solutions were made to test the effectiveness of adding wax to the formulation. Solution 4-1 was 20% total solids using Sartomer® 650 as compatibilizer, with a compatibilizer to resin ratio of 15%. Solution 4-2 was 20% total solids using Benzoflex® 9-88 as compatibilizer, and with a compatibilizer to resin ratio of 25%.

TABLE 9

Coating Composition for Solution 4-1

| Component | Raw Material % Active | Raw Material Solids | Raw Material Total |
|---|---|---|---|
| Sancure ® 777 | 35% | 103.45 g | 295.57 g |
| Sartomer ® SR650 | 100% | 15.52 g | 15.52 g |
| Zonyl ® FSO 100[1] | 20.0% | 0.52 g | 2.59 g |
| 8 micron PMMA beads[2] | 20.0% | 0.52 g | 2.59 g |
| Deionized Water | 100% | 0 g | 283.74 g |

[1]Zonyl ® FSO 100 is available from DuPont.
[2]Techpolymer MBX-8" made by Sekisui Plastics, distributed by Nagase

TABLE 10

Coating Composition for Solution 4-2

| Component | Raw Material % Active | Raw Material Solids | Raw Material Total |
|---|---|---|---|
| Sancure ® 777 | 35% | 95.24 g | 272.11 g |
| Benzoflex ® 9-88 | 100% | 23.81 g | 23.81 g |
| Zonyl ® FSO 100[1] | 20.0% | 0.48 g | 2.38 g |
| 8 micron PMMA beads[1] | 20.0% | 0.48 g | 2.38 g |
| Deionized Water | 100% | 0 g | 299.32 g |

[1]Techpolymer MBX-8" made by Sekisui Plastics, distributed by Nagase.

Solutions for hand coating were prepared by adding candidate wax materials in various quantities to 20 g of one of the two stock solutions. Table 11 shows the solutions that were made, where Wax Percent is the percent solid wax based on solids in the stock solution and Wax Added is the amount of the wax emulsion added to 20 g of stock solution.

TABLE 11

Waxes Used in Example 4

| Solution Number | Stock Solution | Wax Type | Wax Percent | Wax Added |
|---|---|---|---|---|
| 4-1-1 | 4-1 | none | 0% | 0.0 |
| 4-1-2 | 4-1 | 7490 | 4% | 0.345 |
| 4-1-3 | 4-1 | 7490 | 8% | 0.690 |
| 4-1-4 | 4-1 | 7490 | 12% | 1.034 |
| 4-1-5 | 4-1 | Selesol ® 524 | 4% | 0.460 |
| 4-1-6 | 4-1 | Selesol ® 524 | 8% | 0.920 |
| 4-1-7 | 4-1 | Selesol ® 524 | 12% | 1.379 |
| 4-2-1 | 4-2 | None | 0% | 0.0 |
| 4-2-2 | 4-2 | 7490 | 4% | 0.317 |
| 4-2-3 | 4-2 | 7490 | 8% | 0.635 |
| 4-2-4 | 4-2 | 7490 | 12% | 0.952 |
| 4-2-5 | 4-2 | Selesol ® 524 | 4% | 0.423 |
| 4-2-6 | 4-2 | Selesol ® 524 | 8% | 0.847 |
| 4-2-7 | 4-2 | Selesol ® 524 | 12% | 1.270 |
| 4-2-8 | 4-2 | Michem Lube 162 | 4% | 0.508 |
| 4-2-9 | 4-2 | Michem Lube 162 | 8% | 1.016 |
| 4-2-10 | 4-2 | Michem Lube 162 | 12% | 1.524 |
| 4-2-11 | 4-2 | Michem Lube 188 | 4% | 0.508 |
| 4-2-12 | 4-2 | Michem Lube 188 | 8% | 1.016 |
| 4-2-13 | 4-2 | Michem Lube 188 | 12% | 1.524 |
| 4-2-14 | 4-2 | Michem Lube 296 | 4% | 0.508 |
| 4-2-15 | 4-2 | Michem Lube 296 | 8% | 1.016 |
| 4-2-16 | 4-2 | Michem Lube 296 | 12% | 1.524 |
| 4-2-17 | 4-2 | Emulsion 41540 | 4% | 0.317 |
| 4-2-18 | 4-2 | Emulsion 41540 | 8% | 0.635 |
| 4-2-19 | 4-2 | Emulsion 41540 | 12% | 0.952 |
| 4-2-20 | 4-2 | Emulsion 87140 | 4% | 0.317 |
| 4-2-21 | 4-2 | Emulsion 87140 | 8% | 0.635 |
| 4-2-22 | 4-2 | Emulsion 87140 | 12% | 0.952 |

Michem Lube 162, 188, 296, and Emulsions 41540 and 87140 are available from Michelman, Inc.

Selesol®524 is available from Chukyo Yushi Co., Ltd.

E7940 is available from Ashland Chemical, Inc.

Hand coatings were made from each solution. The coatings were made onto 5 mil poly(ethylene terephthalate) film using a #15 Mayer rod. The coatings were dried at around 93° C. for one minute. The resulting dry coat weights were in the range of 5 g/m$^2$.

The sample coatings were imaged in a Hewlett-Packard Color Laserjet 8500 color laser printer using a test pattern consisting of high, medium and low density yellow blocks. The Q Factor of the low density block and the high density block from each image was measured. Table 12 shows the measured Q factor for each wax solution of the different stock solutions level as well as the Q Factor from 3M CG3700 imaged at the same time. The data show improved Low Density Q Factors relative to control samples containing no wax.

TABLE 12

Effect of Different Waxes

| Solution Number | Wax Type | Wax Percent | Low Density Q Factor: | High Density Q Factor: |
|---|---|---|---|---|
| 4-1-1 | none | 0% | 6.8 | 5.3 |
| 4-1-2 | 7490 | 4% | 6.0 | 5.4 |
| 4-1-3 | 7490 | 8% | 6.0 | 5.1 |
| 4-1-4 | 7490 | 12% | 6.3 | 5.2 |
| 4-1-5 | Selesol ® 524 | 4% | 6.0 | 5.3 |
| 4-1-6 | Selesol ® 524 | 8% | 5.4 | 5.3 |
| 4-1-7 | Selesol ® 524 | 12% | 5.4 | 5.4 |
| 4-2-1 | none | 0% | 6.1 | 4.9 |
| 4-2-2 | 7490 | 4% | 5.8 | 5.1 |
| 4-2-3 | 7490 | 8% | 5.4 | 5.0 |
| 4-2-4 | 7490 | 12% | 5.6 | 5.1 |
| 4-2-5 | Selesol ® 524 | 4% | 6.1 | 5.3 |
| 4-2-6 | Selesol ® 524 | 8% | 5.0 | 5.1 |
| 4-2-7 | Selesol ® 524 | 12% | 4.9 | 5.1 |
| 4-2-8 | Michem Lube 162 | 4% | 5.6 | 5.0 |
| 4-2-9 | Michem Lube 162 | 8% | 5.2 | 4.8 |
| 4-2-10 | Michem Lube 162 | 12% | 5.2 | 5.0 |
| 4-2-11 | Michem Lube 188 | 4% | 5.3 | 4.9 |
| 4-2-12 | Michem Lube 188 | 8% | 5.5 | 4.9 |
| 4-2-13 | Michem Lube 188 | 12% | 5.4 | 5.3 |
| 4-2-14 | Michem Lube 296 | 4% | 5.6 | 4.9 |
| 4-2-15 | Michem Lube 296 | 8% | 6.0 | 5.0 |
| 4-2-16 | Michem Lube 296 | 12% | 5.9 | 5.1 |
| 4-2-17 | Emulsion 41540 | 4% | 7.0 | 5.3 |
| 4-2-18 | Emulsion 41540 | 8% | 6.3 | 5.1 |
| 4-2-19 | Emulsion 41540 | 12% | 7.0 | 5.5 |
| 4-2-20 | Emulsion 87140 | 4% | 5.2 | 4.7 |
| 4-2-21 | Emulsion 87140 | 8% | 5.4 | 5.3 |
| 4-2-22 | Emulsion 87140 | 12% | 6.6 | 5.8 |
| CG3700 | — | — | 12.3 | 8.4 |

Example 5 and Comparative Example 5C

Effect of Different Binder Resins

Solutions for hand coating were made to test different binder resins with a compatibilizer that was known to be effective. Both solvent based solutions and water based dispersions were coated. The following resins were tested:

| | |
|---|---|
| Lucidene 395: | styrene/acrylate polymer; $T_g$ = 100° C.; (Morton International) |
| Lucidene 370: | styrene/acrylate polymer; $T_g$ = 103° C.; (Morton International) |
| Lucidene 361: | styrene/acrylate polymer; $T_g$ = 75° C.; (Morton International) |
| Lucidene 141: | styrene/acrylate polymer; $T_g$ = 50° C.; (Morton International) |
| Lucidene 135: | shellac-modified polystyrene; $T_g$ = 84° C.; (Morton International) |
| Eastek 1200: | sulfopolyester resin; $T_g$ = 63° C.; (Eastman Chemical) |
| WB-50: | sulfopolyester resin; $T_g$ = 70° C.; (3M) (from solvent) |
| WB-50: | sulfopolyester resin; $T_g$ = 70° C.; (3M) (from aqueous dispersion) |
| UE3250: | polyester resin; $T_g$ = 40° C.; (Unitika) |

Coating solutions were prepared according to the formulations listed in Table 13. For each binder resin, two solutions were prepared, one containing compatibilizer and a second containing no compatibilizer. In each case, Sartomer 650 was used as the compatibilizer. The total solids of each solution was maintained at 20 percent.

For the water-borne formulations, a small loading of Zonyl FSO-100 fluorosurfactant (Dupont; added at 0.5% based on solid resin) was added to each sample to assist with film formation. In addition to this, it was necessary to add a small amount of 2-propanol to the water-based samples that had no compatibilizer. The alcohol assisted with film-formation during the drying process.

TABLE 13

Effect of Different Binder Resins

| Example # | Binder Resin | Resin Added (g) | Solvent | Solvent Added (g) | SR650 Added (g) | Low Density Q Factor: | High Density Q Factor: |
|---|---|---|---|---|---|---|---|
| 5-1 | Lucidene 395 | 5 | Water | 24 | 1 | 10.4 | 7.0 |
| 5-1C | Lucidene 395 | 5 | Water | 20 | 0 | 15.9 | 8.1 |
| 5-2 | Lucidene 370 | 5 | Water | 24 | 1 | 9.0 | 7.0 |
| 5-2C | Lucidene 370 | 5 | Water | 20 | 0 | 15.2 | 7.8 |
| 5-3 | Lucidene 361 | 5 | Water | 24 | 1 | 15.7 | 6.9 |
| 5-3C | Lucidene 361 | 5 | Water | 20 | 0 | 13.3 | 7.5 |
| 5-4 | Lucidene 141 | 5 | Water | 24 | 1 | 7.6 | 7.1 |
| 5-4C | Lucidene 141 | 5 | Water | 20 | 0 | 12.3 | 7.4 |
| 5-5 | Lucidene 135 | 5 | Water | 24 | 1 | 9.5 | 6.7 |
| 5-5C | Lucidene 135 | 5 | Water | 20 | 0 | 14.2 | 7.5 |
| 5-6 | Eastek 1200 | 5 | Water | 24 | 1 | 8.6 | 7.3 |
| 5-6C | Eastek 1200 | 5 | Water | 20 | 0 | 14.5 | 8.2 |
| 5-7 | WB-50 | 5 | Water | 24 | 1 | 7.2 | 7.3 |
| 5-7C | WB-50 | 5 | Water | 20 | 0 | 15.6 | 8.0 |
| 5-8 | WB-50 | 5 | Cyclohexanone | 24 | 1 | 10.2 | 7.1 |
| 5-8C | WB-50 | 5 | Cyclohexanone | 20 | 0 | 16.8 | 8.8 |
| 5-9 | UE3250 | 5 | 50% 2-butanone 50% toluene | 24 | 1 | 8.5 | 7.2 |
| 5-9C | UE3250 | 5 | 50% 2-butanone 50% toluene | 20 | 0 | 12.7 | 7.6 |

Hand coatings were made from each solution. The coatings were made onto 5 mil poly(ethylene terephthalate) film using a #6 Mayer rod. The coatings were dried at around 120° C. for one minute. The resulting dry coat weights were in the range of 2 g/m$^2$.

The sample coatings were imaged in a Hewlett-Packard Color Laserjet 4500 color laser printer using a test pattern consisting of high, medium and low density yellow blocks.

The Q Factor of the low density block and the high density block from each image was measured. Table 13 shows the measured Q factor for each resin both with and without the added compatibilizer.

The data show that, in virtually all cases, both low density and high density Q Factors are significantly reduced when the compatibilizer is added to the coating.

What is claimed is:

1. A coating receptive to toner image, said coating when imaged having a Q factor value defining image transparency, said coating comprising:

a) at least about 25% of a binder, and b) from about 4 wt % to about 25 wt % being a compatibilizer dispersed throughout said coating, said imaged coating having a low density yellow Q factor with a value at least 2 less than a Q factor of an otherwise identical coating without said compatibilizer wherein the Q→factor for light-scattering for said coating can be predicted as $Q_p$ having a value less than about 5.0 according to the following equation $$Q_p\ -2.34+0.0252*TPSA+23.7*RNCG+0.853Y$$

wherein

AlogP represents an octanol/water partition coefficient, TPSA is total polar surface area of said compatibilizer, RNCG is relative negative charge, and, Y is (AlogP-3.76) for AlogP equal to or greater then 3:76, and Y equals 0 for AlogP less than 3.76.

2. A coating according to claim 1, wherein $Q_p$ is less than 4.8.

3. A coating according to claim 1 wherein said coating is receptive to toners selected from the group consisting of powder toners and solid toners.

4. A coating according to claim 1 wherein the polymeric binder is selected from the group consisting of polyesters, polyurethane dispersions, and styrene-acrylic copolymers.

5. A coating according to claim 1 wherein the polymeric binder comprises from about 50% to about 96% of the dry coating.

6. A coating according to claim 1 wherein said compatibilizer is selected from the group consisting of di-esters and tri-esters.

7. A coating according to claim 6 wherein said compatibilizer is selected from the group consisting dibutoxvethoxyethyl formal, dibutoxyethoxyethyl adipate, dibutyl phthalate, dibutoxyethyl phthalate, 2-ethylhexyl diphenyl phthalate, ethyl phthalate, dipropylene glycol dibenzoate, tri-n-butyl citrate and dialkyl diether glutarate.

8. A coating according to claim 1 wherein said compatibilizer comprises from about 6% to about 20% of said coating.

9. A coating receptive to a toner image, said coating when imaged having a Q factor value defining image transparency, said coating comprising:

a) at least about 25 wt % of a binder; and b) from about 4 wt % to about 25 wt % being a compatibilizer dispersed throughout said coating, wherein said compatibilizer is selected from the group consisting of di-esters and tri-esters, said imaged coating having a low density yellow Q factor with a value of at least 2 less than a Q factor of an otherwise identical coating without said compatibilizer.

10. A coating according to claim 9, wherein said compatibilizer is selected from the group consisting of dibutoxyethoxyethyl formal, dibutoxyethoxyethyl adipate, dibutyl phthalate, dibutoxyethyl phthalate, 2-ethylhexyl diphenyl phthalate, ethyl phthalate, dipropylene glycol dibenzoate, tri-n-butyl citrate and dialkyl diether glutarate.

* * * * *

UNITED STATES PATENT AND TRADEMARK OFFICE

CERTIFICATE OF CORRECTION

PATENT NO. : 6,391,954 B1
DATED : May 21, 2002
INVENTOR(S) : Azizi, Jamshid

It is certified that error appears in the above-identified patent and that said Letters Patent is hereby corrected as shown below:

Column 6,
Line 53, "dibutoxyethoxyethvl" should read -- dibutoxyethoxyethyl --

Column 7,
Line 6, "dibutoxvethoxyethyl" should read -- dibutoxyethoxyethyl --
Line 30, "polymethylmethacrvlates" should read -- polymethylmethacrylates --

Column 19,
Line 26, "Q→factor" should read -- Q factor --
Line 30, "$Q_p$-2.34+0.0252*TPSA+23.7*RNCG+0.8534" should read
-- $Q_p$=-2.34+0.0252*TPSA+23.7*RNCG+0.8534 --
Line 37, "3:76" should read -- 3.76 --

Column 20,
Line 14, "dibutoxvethoxy-" should read -- dibutoxyethoxy- --

Signed and Sealed this

Fourteenth Day of October, 2003

JAMES E. ROGAN
*Director of the United States Patent and Trademark Office*